United States Patent
Hori et al.

(10) Patent No.: US 10,913,386 B2
(45) Date of Patent: Feb. 9, 2021

(54) LIGHTING SYSTEM

(71) Applicant: KOITO MANUFACTURING CO., LTD., Tokyo (JP)

(72) Inventors: Takashi Hori, Shizuoka (JP); Teruaki Yamamoto, Shizuoka (JP); Yusuke Kasaba, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/333,047

(22) PCT Filed: Sep. 8, 2017

(86) PCT No.: PCT/JP2017/032438
§ 371 (c)(1),
(2) Date: Mar. 13, 2019

(87) PCT Pub. No.: WO2018/051910
PCT Pub. Date: Mar. 22, 2018

(65) Prior Publication Data
US 2019/0202335 A1    Jul. 4, 2019

(30) Foreign Application Priority Data
Sep. 15, 2016  (JP) ................. 2016-180578

(51) Int. Cl.
*B60Q 1/00*      (2006.01)
*B60Q 1/04*      (2006.01)
(Continued)

(52) U.S. Cl.
CPC ............. *B60Q 1/0023* (2013.01); *B60Q 1/00* (2013.01); *B60Q 1/0094* (2013.01); *B60Q 1/04* (2013.01);
(Continued)

(58) Field of Classification Search
CPC .......... B60Q 1/0023; B60Q 1/04; B60Q 1/30; B60Q 1/34; B60Q 1/44; B60Q 1/50; B60Q 1/525
See application file for complete search history.

(56) References Cited

U.S. PATENT DOCUMENTS 3,808,448 A * 4/1974 Schneider ............ B60Q 1/0023
                                                     315/77
4,801,938 A * 1/1989 Holmes ................ B60Q 1/0023
                                                     340/600
(Continued)

FOREIGN PATENT DOCUMENTS

EP     2 333 742 A1     6/2011
JP     H05-27037 A      2/1993
(Continued)

OTHER PUBLICATIONS

Machine translation of Ogawa et al., JP 2016-005932A, published Jan. 14, 2016 (Year: 2016).*
(Continued)

*Primary Examiner* — William N Harris
(74) *Attorney, Agent, or Firm* — Sughrue Mion, PLLC

(57) ABSTRACT

A front module (3) is disposed in a front portion of a vehicle (2). An upper module (5) is disposed on a ceiling surface (22) of the vehicle (2). The front module (3) includes a front light source (31) and a front sensor (32). The upper module (5) includes an upper light source (51) and an upper sensor (52).

7 Claims, 3 Drawing Sheets

(51) Int. Cl.
*B60Q 1/50* (2006.01)
*B60Q 1/26* (2006.01)
*B60Q 1/30* (2006.01)
*B60Q 1/34* (2006.01)
*B60Q 1/44* (2006.01)

(52) U.S. Cl.
CPC .............. *B60Q 1/26* (2013.01); *B60Q 1/30* (2013.01); *B60Q 1/34* (2013.01); *B60Q 1/44* (2013.01); *B60Q 1/50* (2013.01); *B60Q 2400/30* (2013.01)

(56) References Cited

U.S. PATENT DOCUMENTS

| | | | |
|---|---|---|---|
| 6,138,062 A | 10/2000 | Usami | |
| 6,254,259 B1* | 7/2001 | Kobayashi | B60Q 1/085 340/459 |
| 9,014,905 B1 | 4/2015 | Kretzschmar et al. | |
| 9,896,020 B2* | 2/2018 | Dellock | F21S 43/33 |
| 10,137,827 B2* | 11/2018 | Kurata | B60Q 1/0023 |
| 2004/0041983 A1 | 3/2004 | Bleiner | |
| 2006/0044818 A1* | 3/2006 | Amagasa | B60Q 1/28 362/514 |
| 2006/0285341 A1* | 12/2006 | Yatsuda | F21S 41/43 362/464 |
| 2007/0002571 A1* | 1/2007 | Cejnek | B60Q 1/12 362/460 |
| 2007/0242470 A1* | 10/2007 | Michiyama | B60Q 1/085 362/464 |
| 2008/0062706 A1* | 3/2008 | Feldmeier | B60Q 1/1423 362/459 |
| 2008/0084165 A1* | 4/2008 | Otsuka | H04N 7/183 315/82 |
| 2008/0129206 A1* | 6/2008 | Stam | B60Q 1/085 315/82 |
| 2008/0175012 A1* | 7/2008 | Shimaoka | B60Q 1/085 362/464 |
| 2011/0068910 A1* | 3/2011 | Iwai | B60Q 1/085 340/435 |
| 2012/0310466 A1 | 12/2012 | Fairfield et al. | |
| 2013/0076240 A1* | 3/2013 | Endo | B60Q 1/085 315/82 |
| 2014/0049973 A1* | 2/2014 | Adachi | B60Q 1/085 362/465 |
| 2014/0247349 A1 | 9/2014 | Heard | |
| 2015/0042225 A1* | 2/2015 | Fukayama | B60Q 1/143 315/82 |
| 2016/0144770 A1* | 5/2016 | Graf | B60Q 1/0023 362/464 |
| 2017/0106793 A1* | 4/2017 | Kumar | B60Q 1/085 |
| 2017/0253170 A1* | 9/2017 | Neal | B60Q 1/0023 |

FOREIGN PATENT DOCUMENTS

| | | |
|---|---|---|
| JP | 2007-137111 A | 6/2007 |
| JP | 2016-005932 A | 1/2016 |
| KR | 10-1040528 B1 | 6/2011 |
| WO | 2016/044280 A1 | 3/2016 |
| WO | 2017/079349 A1 | 5/2017 |

OTHER PUBLICATIONS

Charette, Robert N., "This Car Runs on Code", Feb. 1, 2009, IEEE Spectrum, https://spectrum.ieee.org/transportation/systems/this-car-runs-on-code (Year: 2009).*
International Search Report (PCT/ISA/210), issued by International Searching Authority in corresponding International Application No. PCT/JP2017/032438, dated Dec. 5, 2017.
Written Opinion (PCT/ISA/237) issued by the International Searching Authority in corresponding International Application No. PCT/JP2017/032438, dated Dec. 5, 2017.
Communication dated May 4, 2020, issued by the European Patent Office in counterpart European Application No. 17850812.3.

* cited by examiner

LIGHTING SYSTEM

TECHNICAL FIELD

The presently disclosed subject matter relates to a lighting system adapted to be mounted on a vehicle.

BACKGROUND ART

Patent Document 1 discloses a configuration in which a head lamp and a laser radar device are modularized. The head lamp lights an area ahead of the vehicle. The laser radar device obtains information of ahead of the vehicle, such as the distance to a vehicle ahead of the own vehicle. By adopting such a modular configuration, it is unnecessary to assemble the light source and the sensor to a vehicle body individually, so that the number of assembling steps can be reduced.

PRIOR ART DOCUMENT

Patent Document

Patent Document 1: Japanese Patent Publication No. H05-027037A

SUMMARY

Technical Problem

With the advancement of driving support technology, it is demanded to obtain a greater deal of information from the outside of the vehicle. In order to meet this demand, sensors for obtaining information of the outside of the vehicle may be mounted on the vehicle body as much as possible. However, as the number of sensors increases, an increase in the number of assembling steps is unavoidable. When the above modular configuration is adopted with priority given to efficiency improvement of the assembling operation, an increase in component cost is unavoidable with an increase in the number of sensors.

Therefore, it is demanded to efficiently obtain information of the outside of the vehicle while suppressing an increase in the assembling steps and the component costs.

Solution to Problem

In order to meet the demand described above, an illustrative aspect of the presently disclosed subject matter provides a lighting system adapted to be mounted on a vehicle, comprising:

a first module adapted to be disposed in at least one of a front portion and a rear portion of the vehicle; and a second module adapted to be disposed on a ceiling surface of the vehicle, wherein the first module includes:
a first light source; and
a first sensor configured to sense information of an outside of the vehicle; and wherein the second module includes:
a second light source; and
a second sensor configured to sense information of the outside of the vehicle.

In order to realize more advanced driving support technology, it is necessary to obtain a greater deal of information from the outside of the vehicle. In order to such greater deal of information, the number of sensors may be increased, but an increase in the number of installation steps is unavoidable. By adopting a structure in which the light source and the sensor are modularized, an increase in the number of installation steps can be suppressed, but the component cost of the module greatly exceeds the component cost of the sensor alone. Therefore, a more efficient modular layout needs to be considered.

The inventors of the present application paid their attentions to the ceiling surface of the vehicle. Since the ceiling surface is not obstructed in the periphery, there can be obtained high degree of freedom for setting the sensing range of the sensor, as well as high visibility of the light emitted from the light source is high, particularly in the front-rear direction and the left-right direction of the vehicle. The inventors concluded that the ceiling surface of the vehicle is optimal as a location for the additional placement of a module including a light source and a sensor.

Therefore, it is possible to efficiently obtain information of the outside of the vehicle while suppressing an increase in the assembling steps and the component costs.

The above lighting system may be configured such that the first light source includes at least one of a head lamp, a daytime lamp, a tail lamp, a braking lamp, a direction indicator lamp, and a clearance lamp.

Since the ceiling surface is not obstructed in the periphery, the visibility of the light emitted from the second light source is high. Accordingly, the information provided from the second light source is easily recognized by a passenger of another vehicle located around the vehicle or a pedestrian. This makes it possible to improve the functionality of the additionally provided second module.

In this case, the above lighting system may be configured such that the second light source is configured to emit light to provide information indicating that the vehicle is in a driving support operation.

According to such a configuration, it is easy to cause the passenger of another vehicle located around the vehicle or the pedestrian to pay his/her attention to the fact that the vehicle is in the driving support operation.

The above lighting system may be configured such that the first module is adapted to be disposed in each of a left front corner portion, a right front corner portion, a left rear corner portion, and a right rear corner portion of the vehicle.

According to such a configuration, it is possible to efficiently obtain information of the periphery of the vehicle while securing a basic lighting function required for the vehicle.

The above lighting system may be configured such that the second sensor is adapted to be disposed such that a sensing range thereof compensates a blind area of a sensing range of the first sensor.

Since the second sensor is provided on the ceiling surface of the vehicle without any obstruction in the periphery, there can be obtained, for the second sensor, high degree of freedom for determining the installation position and for setting the sensing range. Accordingly, it is possible to easily cause the second sensor to compensate the blind area of the sensing range of the first sensor. This makes it possible to improve the functionality of the additionally provided second module.

The above lighting system may be configured such that the second sensor is configured to sense the information of the outside of the vehicle in a different manner from the first sensor.

According to such a configuration, complementary information sensing can be realized by the first sensor and the second sensor. For example, in a case where the sensing range of the first sensor and the sensing range of the second sensor are different from each other, the information of the outside the vehicle can be efficiently obtained by selecting a sensor type suitable for each sensing range. On the other hand, in a region where the sensing range of the first sensor and the sensing range of the second sensor overlap, more detailed information can be obtained by referring to results sensed by the plural types of sensors.

The above lighting system may be configured such that:
the first sensor includes a LiDAR sensor, a millimeter wave radar, and an ultrasonic sensor; and
the second sensor includes a camera.

For example, in a case where the first sensor is a millimeter wave radar, the millimeter wave radar can sense the distance to an object within the sensing range, but cannot sense the type of the object. By obtaining an image of the object through the camera, for example, it is possible to distinguish whether the object is a vehicle or a pedestrian.

The above lighting system may be configured such that:
the first module includes a first controller configured to control operations of the first light source and the first sensor; and
the second module includes a second controller configured to control operations of the second light source and the second sensor.

According to such a configuration, the processing for controlling operations of the first light source and the first sensor can be at least partially assigned to the first controller in the first module. Similarly, the processing for controlling operations of the second light source and the second sensor can be at least partially assigned to the second controller in the second module. As a result, the control load of an integral controller mounted on the vehicle can be reduced.

DESCRIPTION OF EMBODIMENTS

Examples of embodiments will be described below in detail with reference to the accompanying drawings. In each of the drawings used in the following descriptions, the scale is appropriately changed in order to make each of the members have a recognizable size.

In the accompanying drawings, an arrow F represents a forward direction of the illustrated structure. An arrow B represents a rearward direction of the illustrated structure. An arrow U represents an upward direction of the illustrated structure. An arrow D represents a downward direction of the illustrated structure. An arrow L represents a leftward direction of the illustrated structure. An arrow R represents a rightward direction of the illustrated structure. The terms of "left" and "right" used in the following descriptions indicate the left-right directions as viewed from the driver's seat.

Figure 1A:
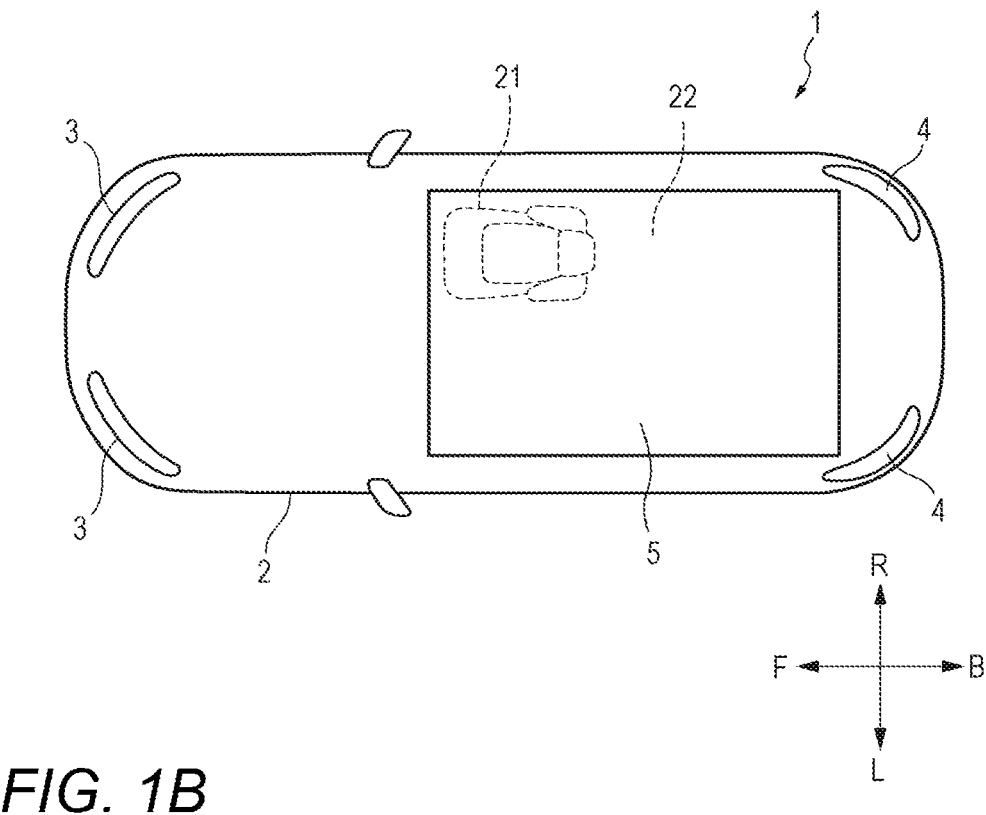
FIG. 1A and FIG. 1B illustrate positions of a first module and a second module included in a lighting system according to an embodiment.
Figure 1B:
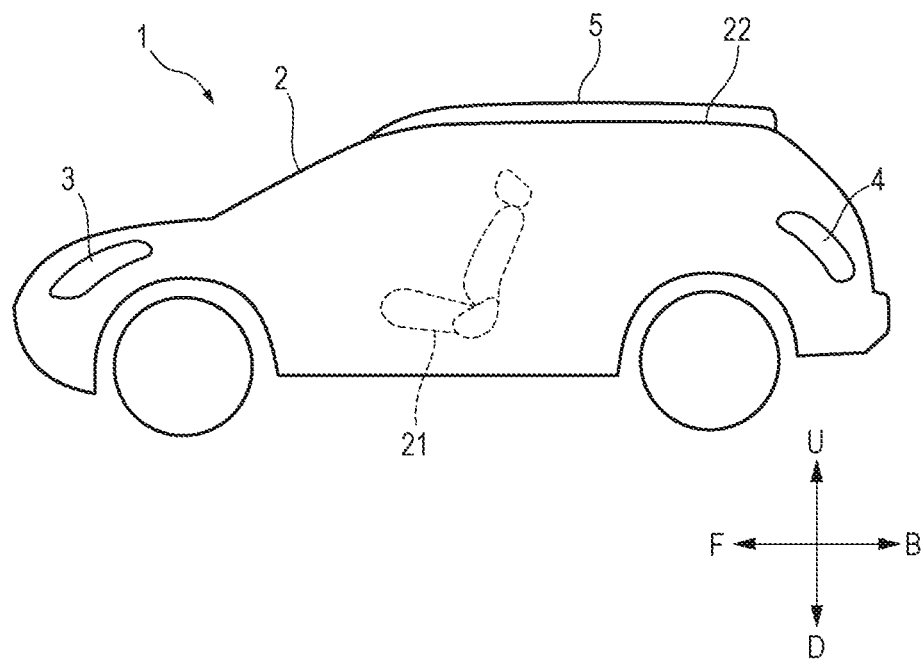

As illustrated in FIG. 1A and FIG. 1B, a lighting system 1 according to an embodiment is mounted on a vehicle 2. The lighting system 1 includes a front module 3, a rear module 4 and an upper module 5.

The front module 3 (one example of the first module) is disposed in a front portion of the vehicle 2. As used herein, the expression "a front portion of the vehicle 2" means a portion of a vehicle body of the vehicle 2 situating ahead of a driver's seat 21.

The rear module 4 (one example of the first module) is disposed at a rear portion of the vehicle 2. As used herein, the expression "a rear portion of the vehicle 2" means a portion of the vehicle body of the vehicle 2 situating behind the driver's seat 21.

The upper module 5 (one example of the second module) is disposed on a ceiling surface 22 of the vehicle 2.

Figure 2:
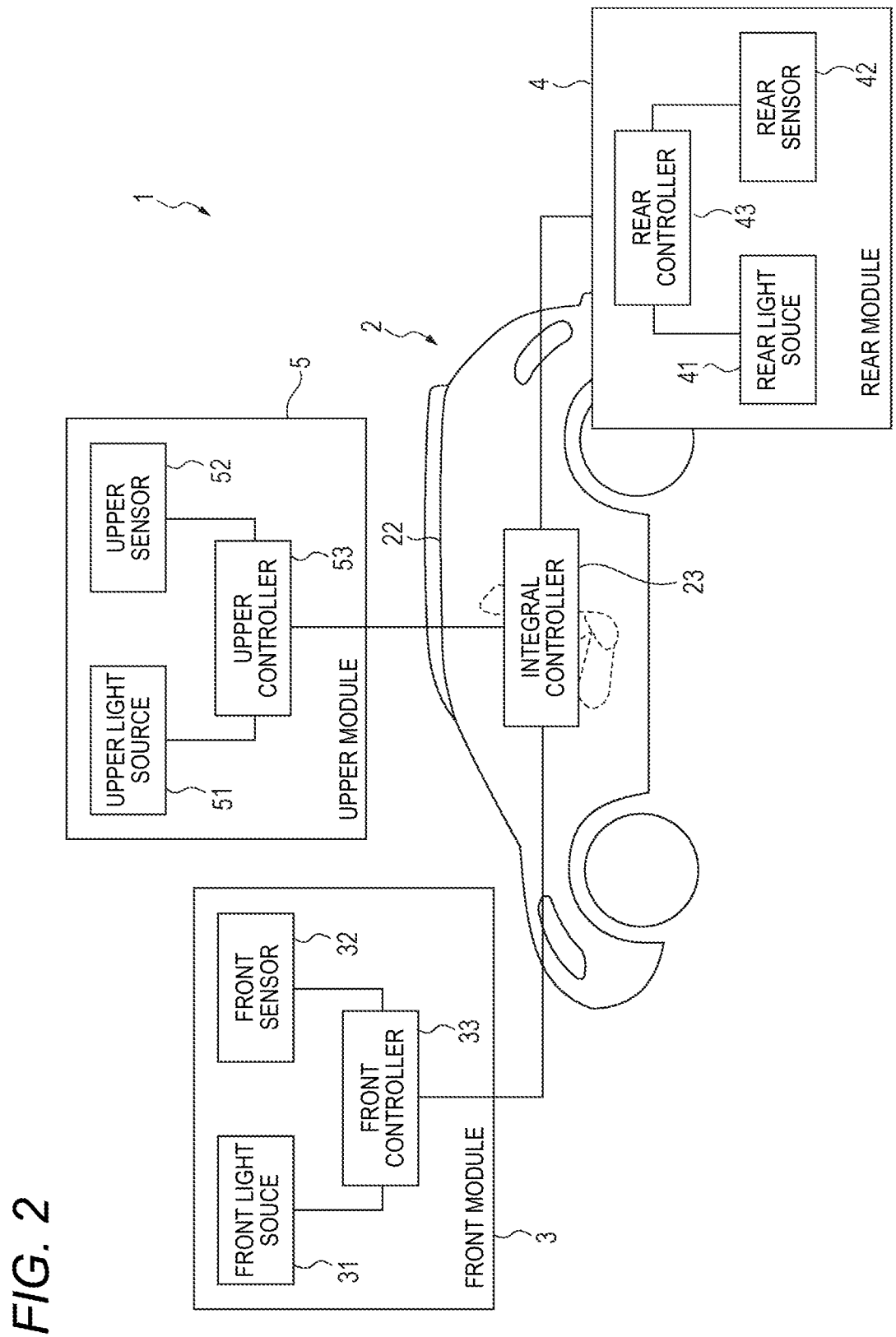
FIG. 2 illustrates a configuration of the lighting system.

As illustrated in FIG. 2, the front module 3 includes a front light source 31 and a front sensor 32.

The front light source 31 (one example of the first light source) includes at least one of a head lamp, a direction indicator lamp, a clearance lamp, and a daylight lamp.

The front sensor 32 (one example of the first sensor) obtains information of at least ahead of the vehicle 2 (one example of the outside of the vehicle). The front sensor 32 includes at least one of a LiDAR (Light Detection and Ranging) sensor, a millimeter wave radar, and an ultrasonic sensor.

The rear module 4 includes a rear light source 41 and a rear sensor 42.

The rear light source 41 (one example of the first light source) includes at least one of a tail lamp, a braking lamp, a direction indicator lamp, and a clearance lamp.

The rear sensor 42 (one example of the first sensor) obtains information of at least behind of the vehicle 2 (one example of the outside of the vehicle). The rear sensor 42 includes at least one of a LiDAR sensor, a millimeter wave radar, and an ultrasonic sensor.

The upper module 5 includes an upper light source 51 and an upper sensor 52.

The upper light source 51 (one example of the second light source) includes at least one of a notification lamp and a daylight lamp.

The upper sensor 52 (one example of the second sensor) includes at least a camera. The camera is configured to capture an image of the surroundings of the vehicle 2 (one example of the outside of the vehicle).

In order to realize more advanced driving support technology, it is necessary to obtain a greater deal of information from the outside of the vehicle 2. In order to such greater deal of information, the number of sensors may be increased, but an increase in the number of installation steps is unavoidable. By adopting a structure in which the light source and the sensor are modularized, an increase in the number of installation steps can be suppressed, but the component cost of the module greatly exceeds the component cost of the sensor alone. Therefore, a more efficient modular layout needs to be considered.

The inventors of the present application paid their attentions to the ceiling surface 22 of the vehicle 2. Since the ceiling surface 22 is not obstructed in the periphery, there can be obtained high degree of freedom for setting the sensing range of the sensor, as well as high visibility of the light emitted from the light source is high, particularly in the front-rear direction and the left-right direction of the vehicle 2. The inventors concluded that the ceiling surface 22 of the vehicle 2 is optimal as a location for the additional placement of a module including a light source and a sensor.

Therefore, it is possible to efficiently obtain information of the outside of the vehicle 2 while suppressing an increase in the assembling steps and the component costs.

As described above, the upper light source 51 of the upper module 5 includes at least one of a notification lamp and a daylight lamp. These are light sources for providing information to the outside of the vehicle 2.

Since the ceiling surface 22 is not obstructed in the periphery, the visibility of the light emitted from the upper light source 51 is high. Accordingly, the information provided from the upper light source 51 is easily recognized by a passenger of another vehicle located around the vehicle 2 or a pedestrian. This makes it possible to improve the functionality of the additionally provided upper module 5.

For example, the notification lamp serving as the upper light source 51 provides, to the outside of the vehicle 2, information indicating that the vehicle 2 is in the driving support operation. As used herein, the term "driving support operation" includes not only an operation in which any of acceleration, steering, and braking is automatically performed, but also the semi-self-driving and the full-self-driving. Examples of the way of notification include lighting or flashing in a predetermined color different from the light emitted by a head lamp or the like, and displaying a message such as "now self-driving".

According to such a configuration, it is easy to cause the passenger of another vehicle located around the vehicle 2 or the pedestrian to pay his/her attention to the fact that the vehicle 2 is in the driving support operation.

As illustrated in FIG. 1A, the front module 3 is provided in each of a left front corner portion and a right front corner portion of the vehicle 2. As used herein, the expression "a left front corner portion of the vehicle 2" means a portion included in a front portion of the vehicle 2 and located on the left of a center in the left-right direction of the vehicle 2. As used herein, the expression "a right front corner portion of the vehicle 2" means a portion included in a front portion of the vehicle 2 and located on the right of the center in the left-right direction of the vehicle 2.

As illustrated in FIG. 1A, the rear module 4 is provided in each of a left rear corner portion and a right rear corner portion of the vehicle 2. As used herein, the expression "a left rear corner portion of the vehicle 2" means a portion included in a rear portion of the vehicle 2 and located on the left of a center in the left-right direction of the vehicle 2. As used herein, the expression "a right rear corner portion of the vehicle 2" means a portion included in a rear portion of the vehicle 2 and located on the right of a center in the left-right direction of the vehicle 2.

According to such a configuration, it is possible to efficiently obtain information of the periphery of the vehicle 2 while securing a basic lighting function required for the vehicle 2.

Figure 3:
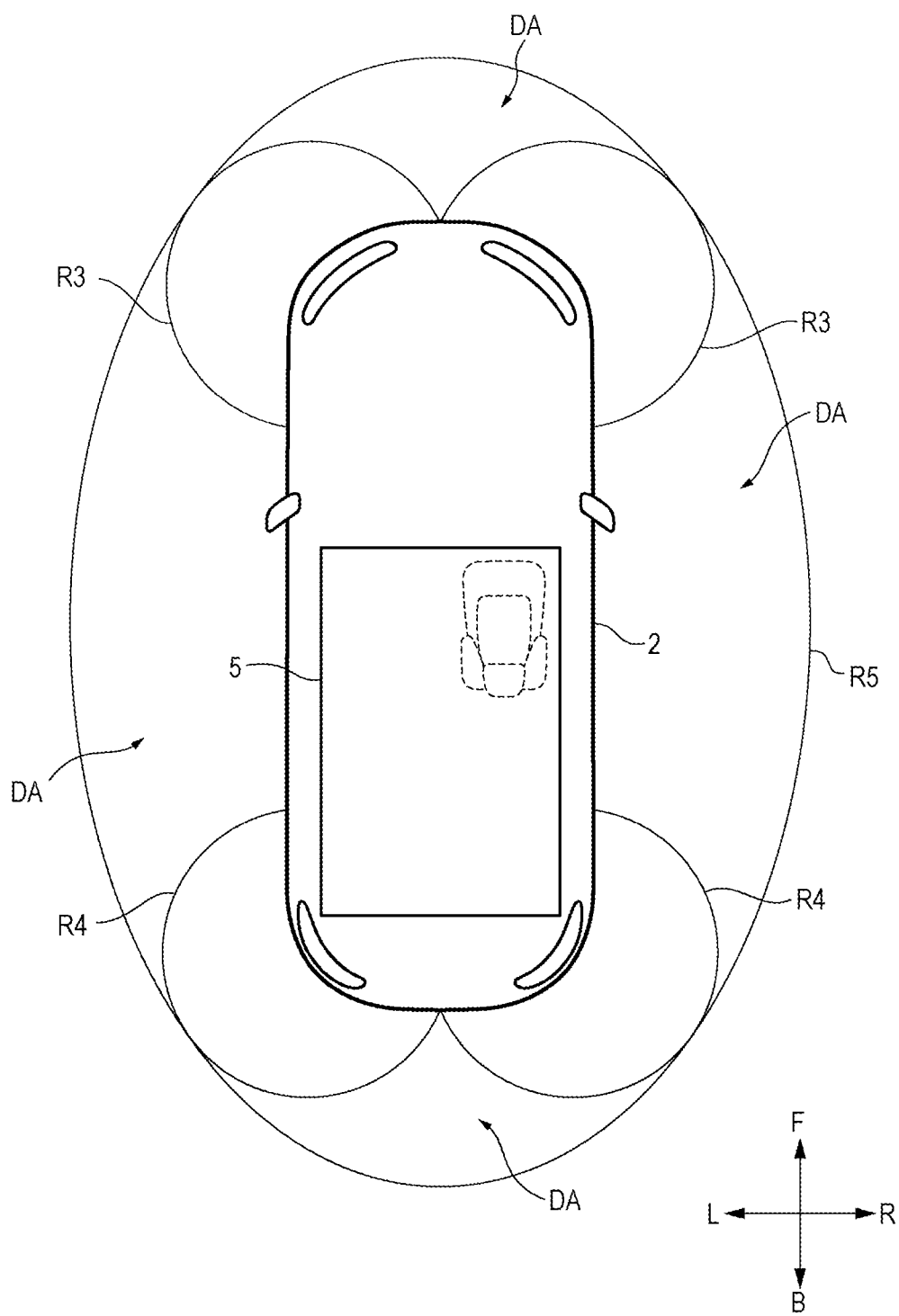
FIG. 3 illustrates sensing ranges of the first sensor and the second sensor in the lighting system.

FIG. 3 schematically illustrates a sensing range R3 of the front sensor 32, a sensing range R4 of the rear sensor 42, and a sensing range R5 of the upper sensor 52. A symbol DA in FIG. 3 represents a blind spot between the sensing range R3 and the sensing range R4. In the present embodiment, the upper sensor 52 is disposed such that the sensing range R5 thereof compensates for the blind spot DA.

Since the upper sensor 52 is provided on the ceiling surface 22 of the vehicle 2 without any obstruction in the periphery, there can be obtained, for the upper sensor 52, high degree of freedom for determining the installation position and for setting the sensing range. Accordingly, it is possible to easily cause the upper sensor 52 to compensate the blind area DA of the sensing range R3 of the front sensor 32 and the sensing range R4 of the rear sensor 42. This makes it possible to improve the functionality of the additionally provided upper module 5.

As described above, the front sensor 32 and the rear sensor 42 include at least one of a LiDAR sensor, a milli-meter wave radar, and an ultrasonic sensor, and the upper sensor 52 includes at least a camera. That is, the upper sensor 52 obtains information of the outside of the vehicle 2 in a different manner from the front sensor 32 and the rear sensor 42.

According to such a configuration, complementary information sensing can be realized by the front sensor 32, the rear sensor 42, and the upper sensor 52. For example, in a case where the sensing range R3, the sensing range R4, and the sensing range R5 are different from each other, the information of the outside the vehicle 2 can be efficiently obtained by selecting a sensor type suitable for each sensing range.

On the other hand, in a region where at least two of the sensing range R3, the sensing range R4, and the sensing range R5 overlap, more detailed information can be obtained by referring to results sensed by the plural types of sensors. For example, in a case where the front sensor 32 is a millimeter wave radar and the upper sensor 52 is a camera, the millimeter wave radar can sense the distance to an object within the sensing range R3, but cannot sense the type of the object. By obtaining an image of the object through the camera, for example, it is possible to distinguish whether the object is a vehicle or a pedestrian.

As illustrated in FIG. 2, the front module 3 may include a front controller 33. The front controller 33 is configured to control the operations of the front light source 31 and the front sensor 32.

The rear module 4 may include a rear controller 43. The rear controller 43 is configured to control the operations of the rear light source 41 and the rear sensor 42.

The upper module 5 may include an upper controller 53. The upper controller 53 is configured to control the operations of the upper light source 51 and the upper sensor 52.

The front controller 33, the rear controller 43, and the upper controller 53 are communicably connected to an integral controller 23 such as an ECU mounted on the vehicle 2.

According to such a configuration, the processing for controlling operations of the front light source 31 and the front sensor 32 can be at least partially assigned to the front controller 33 in the front module 3. Similarly, the processing for controlling operations of the rear light source 41 and the rear sensor 42 can be at least partially assigned to the rear controller 43 in the rear module 4. Similarly, the processing for controlling operations of the upper light source 51 and the upper sensor 52 can be at least partially assigned to the upper controller 53 in the upper module 5. As a result, the control load of the integral controller 23 of the vehicle 2 can be reduced.

The front controller 33 of the front module 3 can obtain information of at least ahead of the vehicle 2 by appropriately processing the signal outputted from the front sensor 32. Examples of such information include the position and type of an object (a vehicle, a human, an animal, a building, or the like) that is present at least ahead of the vehicle 2. However, the signal processing performed by the front controller 33 may be at least partially performed by the integral controller 23.

The rear controller 43 of the rear module 4 can obtain information of at least behind the vehicle 2 by appropriately processing the signal outputted from the rear sensor 42. Examples of such information include the position and type of an object (a vehicle, a human, an animal, a building, or the like) that is present at least behind the vehicle 2. However, the signal processing performed by the rear controller 43 may be at least partially performed by the integral controller 23.

The upper controller 53 of the upper module 5 can obtain information of the surroundings of the vehicle 2 by appropriately processing the signal outputted from the upper sensor 52. Examples of such information include the position and type of an object (a vehicle, a human, an animal, a building, or the like) that is present around the vehicle 2. However, the signal processing performed by the upper controller 53 may be at least partially performed by the integral controller 23.

The above embodiments are merely examples for facilitating understanding of the gist of the presently disclosed subject matter. The configuration according to each of the above embodiments can be appropriately modified or improved without departing from the gist of the presently disclosed subject matter.

In the above embodiment, the front sensor 32 and the rear sensor 42 include at least one of a LiDAR sensor, a millimeter wave radar, and an ultrasonic sensor, and the upper sensor 52 includes at least a camera. However, as long as the sensing manner is different, for example, there may be employed a combination in which at least one of the front sensor 32 and the rear sensor 42 includes a LiDAR sensor and the upper sensor 52 includes a millimeter wave radar.

As used herein, the expression "a sensor for sensing in a different manner from another sensor" comprehends a sensor a type of which is identical with another sensor but a sensing range of which is different from another sensor. Accordingly, there may be employed a combination in which the front sensor 32 includes a LiDAR sensor for obtaining information of ahead of the vehicle 2, and the upper sensor 52 includes a LiDAR sensor for obtaining information of on the right of the vehicle 2.

In the above embodiment, the front controller 33, the rear controller 43, and the upper controller 53 are connected to a common integral controller 23. However, any one of the front controller 33, the rear controller 43, and the upper controller 53 may be connected to another control device that is mounted on the vehicle 2 but is different from the integral controller 23.

The present application is based on Japanese Patent Application No. 2016-180578 filed on Sep. 15, 2016, the entire contents of which are incorporated herein by reference.

The invention claimed is:

1. A lighting system adapted to be mounted on a vehicle, comprising:
a first module, in which a first light source and a first sensor that is configured to output a first signal corresponding to first information of a first outside area of the vehicle, the first module being adapted to be disposed in at least one of a front portion and a rear portion of the vehicle;
a second module, in which a second light source and a second sensor that is configured to output a second signal corresponding to second information of a second outside area of the vehicle, the second module being adapted to be disposed on a ceiling surface of the vehicle; and
a common controller, connected to the first module and second module, wherein
the first module includes a first controller configured to commonly control operations of the first light source and the first sensor and configured to perform processing of the first signal to obtain the first information;
the second module includes a second controller configured to commonly control operations of the second light source and the second sensor and configured to perform processing of the second signal to obtain the second information;
the common controller is configured to share the processing of the first signal and to share processing of the second signal; and
the first information and the second information include information relating to a position and a type of an object.

2. The lighting system according to claim 1, wherein the first light source includes at least one of a head lamp, a daytime lamp, a tail lamp, a braking lamp, a direction indicator lamp, and a clearance lamp.

3. The lighting system according to claim 2, wherein the second light source is configured to emit light to provide information indicating that the vehicle is in a driving support operation.

4. The lighting system according to claim 1, wherein the first module is adapted to be disposed in each of a left front corner portion, a right front corner portion, a left rear corner portion, and a right rear corner portion of the vehicle.

5. The lighting system according to claim 1, wherein the second sensor is adapted to be disposed such that a sensing range thereof compensates a blind area of a sensing range of the first sensor.

6. The lighting system according to claim 1, wherein the second sensor is configured to sense information of the outside of the vehicle in a different manner from the first sensor.

7. The lighting system according to claim 1, wherein the first sensor includes at least one of a LiDAR sensor, a millimeter wave radar, or an ultrasonic sensor; and
wherein the second sensor includes a camera.

\* \* \* \* \*